(12) United States Patent
Kodama et al.

(10) Patent No.: US 11,460,914 B2
(45) Date of Patent: Oct. 4, 2022

(54) MODULAR SENSOR APPARATUS AND SYSTEM TO CAPTURE MOTION AND LOCATION OF A HUMAN BODY, BODY PART, LIMB, OR JOINT

(71) Applicant: Brave Virtual Worlds, Inc., McLean, VA (US)

(72) Inventors: William Sheng Kodama, McLean, VA (US); Dhyey Devang Parikh, Chantilly, VA (US); Evan Anders Magnusson, Boise, ID (US)

(73) Assignee: Brave Virtual Worlds, Inc., McLean, VA (US)

( * ) Notice: Subject to any disclaimer, the term of this patent is extended or adjusted under 35 U.S.C. 154(b) by 0 days.

(21) Appl. No.: 17/352,790

(22) Filed: Jun. 21, 2021

(65) Prior Publication Data

US 2021/0311546 A1 Oct. 7, 2021

Related U.S. Application Data

(63) Continuation-in-part of application No. 16/797,603, filed on Feb. 21, 2020, now Pat. No. 11,039,974.

(60) Provisional application No. 62/881,590, filed on Aug. 1, 2019.

(51) Int. Cl.
*G06F 3/01* (2006.01)
*G06T 19/00* (2011.01)
*G06T 13/40* (2011.01)

(52) U.S. Cl.
CPC .............. *G06F 3/011* (2013.01); *G06T 13/40* (2013.01); *G06T 19/006* (2013.01); *G06T 2200/04* (2013.01); *G06T 2200/08* (2013.01)

(58) Field of Classification Search
CPC .............. A61H 3/00; G06F 3/01; G06F 3/011
See application file for complete search history.

(56) References Cited

U.S. PATENT DOCUMENTS

| | | | |
|---|---|---|---|
| 8,337,306 B2 | 12/2012 | Larsen et al. | |
| 8,624,924 B2 | 1/2014 | Dobbins et al. | |
| 8,696,458 B2 | 4/2014 | Foxlin et al. | |
| 9,070,019 B2 | 6/2015 | Holz | |
| 9,582,072 B2 | 2/2017 | Connor | |
| 10,234,934 B2 | 3/2019 | Connor | |
| 10,321,873 B2 | 6/2019 | Connor | |
| 10,383,550 B2 | 8/2019 | Hyde et al. | |
| 10,415,975 B2 | 9/2019 | Bellusci et al. | |
| 10,726,560 B2 | 7/2020 | Holzer et al. | |
| 2010/0285877 A1 | 11/2010 | Corazza | |
| 2011/0025562 A1 | 2/2011 | Hol et al. | |
| 2015/0266180 A1* | 9/2015 | Kornbluh | B25J 9/1633 700/260 |
| 2016/0349790 A1* | 12/2016 | Connor | G06F 1/163 |
| 2018/0024635 A1 | 1/2018 | Kaifosh et al. | |
| 2019/0056422 A1 | 2/2019 | Park et al. | |

* cited by examiner

*Primary Examiner* — Jason-Dennis N Stewart
(74) *Attorney, Agent, or Firm* — Woods Rogers Vandeventer Black PLC; Nathan A. Evans (57) ABSTRACT

A system and apparatus that performs a capture of human motion and location in order to relay the mechanics of joint and body movement to virtual- and augmented-reality based environments. Collected data and measurements using sensors that can be analyzed and sorted. The sensors can be used to passively collect data or can be used to provide data into a feedback loop to drive other systems.

20 Claims, 10 Drawing Sheets

MODULAR SENSOR APPARATUS AND SYSTEM TO CAPTURE MOTION AND LOCATION OF A HUMAN BODY, BODY PART, LIMB, OR JOINT

CROSS-REFERENCE TO RELATED APPLICATIONS

The present application relies on the disclosures of and claims priority to and the benefit of the filing date of U.S. Provisional Patent Application No. 62/881,590, filed Aug. 1, 2019, and U.S. Non-Provisional patent application Ser. No. 16/797,603, filed Feb. 21, 2020. The disclosures of those applications are hereby incorporated by reference herein in their entireties.

BACKGROUND OF INVENTION

Field of the Invention

The present invention relates generally to a system and apparatus that performs the capture of human motion and location in order to relay the mechanics of joint and body movement to virtual- and augmented-reality based environments, for example.

Another object of the present invention is to provide data and collect measurements using sensors that can then be analyzed and sorted. Additionally, these sensors can be used to passively collect data or can be used to provide data into a feedback loop to drive other systems.

Description of Related Art

Wearable technology is a category of electronic devices that can be worn as accessories providing hand free capabilities and sending/receiving data via the internet. From the invention of eyeglass to smartwatches, wearable technologies have continued to dominate the consumer marketspace. Over the past few years there has been a shift to more specialized and practical applications for such technologies. These include virtual- and augmented-reality, physical therapy, fitness, and general user wellness.

One specialized area of wearable technology adoption can be found in virtual- and augmented-reality systems. Current virtual- and augmented-reality systems have the capability to develop renderings of three-dimensional models that represent either the user of such systems or the surrounding environment. This is done through systems that generally comprise a headset (head-mounted device), controllers, and/or lighthouses that enables the viewing of a three-dimensional virtual world. The development of such a three-dimensional world can be attributed to tracking a participant or a user as they move around in a virtual environment or world. The focus on such tracking of motion and location has been critical to develop realistic behaviors of a participant or user and surrounding environment interactions. This tracking has been performed recently using sensors embedded in either the aforementioned headset, controllers, and/or lighthouses. However, a current focus has shifted towards potentially embedding such movement and location tracking based sensors on the body due to the need of reducing the amount of equipment required for virtual- and augmented reality based systems. This need has become more apparent due to another need of making virtual and augmented reality able to truly immerse the user into a virtual environment beyond only visual and auditory cues. Both needs are apparent in all use cases of virtual and augmented reality and in all simulation-based endeavors that involve a user interacting with virtual space. Virtual space may include any virtual objects, virtual environments, or virtual beings that represent a real composition of matter (of which physics apply to and therefore supplies a normal force) in a three-dimensional virtual world.

Simple and compact movement and location tracking can help improve the immersive experience in a virtual space by actually placing the user's or participant's own movements in such a space. By doing so, entertainment and training would be improved, such as sports, martial arts, and military training. Accurate depictions of human movement when participating in combat with an enemy or when attempting to perfect a golf swing can help both reduce potential injuries or harm and increase biomechanical performance when viewing their motion in a virtual space. The quantitative feedback from tracking movement would help reduce the reliance on intuition of how one is moving in a virtual space and in the real world. The integration of such a simple, compact, and full body movement and location tracking system is not only restricted by non-modular based wearables but also by external trackers, limited sensor sets, and attempts to map the neuromuscular interactions of the body to movement.

Current movement tracking based systems do not sufficiently achieve the need to track and analyze all human movement patterns without additional limitations to the user to then be relayed or re-rendered seamlessly to a virtual space, and previous attempts by others have mostly been failures. A summary of known devices and the existing state-of-the-art having at least one of the following key performance deficiencies or shortcomings, among others, includes:

External Vs. On-Body Tracking:
Previous attempts to translate tracking of human motion and location into a virtual space have been done using external sensors or location constrained lighthouses/cameras, whereas the current invention takes all tracking and places it directly onto the human body without the need of an extensive array of external devices. By doing so, granularity can be achieved on how a user moves to then improve the overall experience in a virtual space.

Mobility and Modularity:
Previous attempts have tried to embed movement tracking into clothing or fabrics that are commonly worn by users today. This presents a problem by limiting the user's range of motion due to having to wear either a full suit or skin tight clothing to ensure that the sensors or tracking devices are as close to the human body as possible. Another issue is the non-modularity associated with such an attempt where users must only rely on the clothing with the embedded sensors and cannot focus on a single joint or location and they must be fitted to ensure that the sensors are in the right location, making this approach non-economical. The approach of the current invention is to still use fabrics to embed the sensors or devices, but in a more modular format such as bands or sleeves to ensure that the user can put them on anywhere and can have varying degrees of freedom in terms of how many sensors they may want without restraining their overall movement.

Limited Sensor or Tracking Sets:
Previous attempts have focused on minimizing the amount of sensors needed to track human movement. However, this presents the common problem of missing out on key movement patterns that require full body analysis, something that the current invention is able to provide. By promoting a full body tracking system for movement and location, the current invention increases the overall immersiveness of a virtual space.

Overall, the currently-available approaches are not practical because they either use heavy, external equipment to track movement and location for a virtual space or are simply uneconomical. Furthermore, they do not take into account the significance of understanding and analyzing human motion which will make it difficult for them to provide a fully immersive experience in a virtual space. Patents referenced herein include, but are not limited to: U.S. Patent Application No. 2019/0056422A1, U.S. Pat. No. 10,321,873B2, U.S. Pat. No. 9,070,019B2, U.S. Pat. No. 10,415,975B2, US Patent Application No. 2018/0024635 A1; of which these U.S. patents and patent applications are hereby incorporated by reference in their entirety herein.

SUMMARY OF INVENTION

It is a general object of the present invention to provide a modular system and method providing motion capture and location data that can be used in, but not limited to, a virtual reality environment, using a wearable that implements novel tracking and methods for full, on-body applications.

Another general object of the present invention is to provide a novel, modular electronic system to collect an interchangeable or combination of sensor data such as, but not limited to, accelerometer, gyroscope, magnetometer, barometer, temperature, and location based sensors, such as ultra wide band (UWB), ultrasonic, Global Positioning System (GPS), Radio Frequency (RF), Lidar and Bluetooth sensor systems. In other aspects of the present invention, human biometrics can also be captured using, by way of example only, electrocardiogram (ECG or EKG), electroencephalogram (EEG), electromyogram (EMG), and/or electrooculogram (EOG) to measure biopotentials, such as the electrical output of human activity. Combinations of all sensors noted herein are contemplated by the present invention. The collected data can then be fused using algorithms described herein to obtain global positioning, physiological activity, and/or orientation of the wearer in real-time and/or autonomously.

It is another general object of the present invention to provide a novel, modular electronic housing frame design for ergonomic use in any portable wearable, especially for use in conjunction with virtual and augmented reality applications and environments.

It is also an object of the invention to provide improved standardized and modular electrical and software systems for collecting, sending and analyzing motion and location data, especially for hardware used in conjunction with virtual and augmented reality situations, applications, and environments.

Another object of the present invention is to provide an improved sensor system for tracking and analyzing movement, including for hardware, especially modular wearable hardware, used in conjunction with virtual and augmented reality situations, applications, and environments. Relatedly, an additional object of the invention is to provide a user's movement and location information to a parent feedback system that relies on frictional forces to resist and restrict motion.

A further object of the present invention is to provide a method of interfacing with virtual reality to provide visual and audio feedback to a user.

Another useful object of the present invention is to provide a wireless, modular housing and electrical system, thus causing a safer and functionally improved system to be used for wearable hardware in conjunction with virtual and augmented reality situations, applications, and environments.

Another object of the invention is to provide a tightening system that is multipurpose, accessible, and intuitive.

These objects and others are achieved, in a preferred embodiment of the present invention, by providing motion capture and location tracking using modular wearables that interface with virtual reality. The motion capture and location tracking, in aspects, is collected by, but not limited to, an accelerometer, a gyroscope, a magnetometer, a barometric, a temperature, and/or location based sensors such as ultra wide band, ultrasonic, GPS, RF, Lidar and Bluetooth sensor systems placed on, across, around, or about the body, such as the full body. In other aspects of the present invention, human biometrics can be captured using, by way of example only, electrocardiogram (ECG or EKG), electroencephalogram (EEG), electromyogram (EMG) and electrooculogram (EOG) to measure biopotentials, the electrical output of human activity. By collecting the sensor measurements from the sensor system, the data can be fused together using sensor fusion algorithms to obtain global positioning and orientation of the wearer in real-time or near real-time, including in aspects absolute global positioning, physiological activity, and orientation of the wearer. The electrical housing and electrical design provide an ergonomic and standardized mechanism for partial or full body motion capture that is safe and robust when active and under various, rigorous conditions.

BRIEF DESCRIPTION OF THE DRAWINGS

The accompanying drawings illustrate certain aspects of embodiments of the present invention and should not be used to limit the invention. Together with the written description the drawings explain certain principles of the invention.

DETAILED DESCRIPTION OF INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Figure 4:
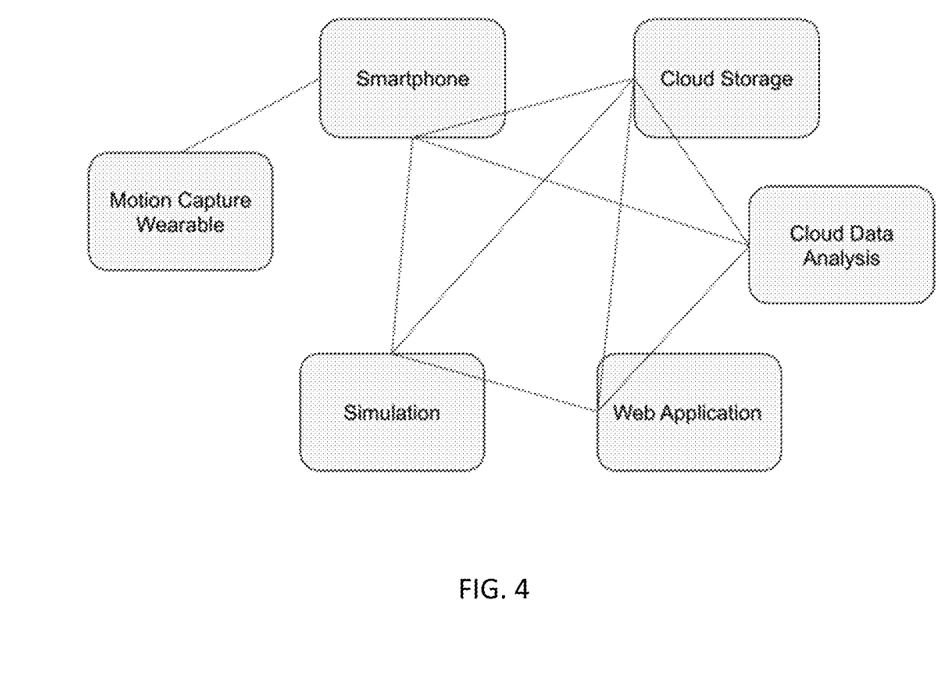
FIG. 4 is a flow diagram of the data from one embodiment of the present invention to peripheral devices and a custom data analytics pipeline.

An embodiment of the present invention is shown in FIG. 4, which displays a flow of data and how the user, simulation, software and motion capture wearable interact with one another. In aspects, the user's motions in the real world are captured by, but not limited to, an accelerometer, a gyroscope, a magnetometer, a barometer, a temperature, and location based sensors such as UWB, ultrasonic, GPS, RF, Lidar, Bluetooth, along with physiological or biopotential based sensors such as EKG, ECG, EEG, EMG, and EOG sensors which are transmitted to a smart phone, computer, and/or wireless (or wired) communication module that assists or enables storing the data in the cloud for use with application such as, but not limited to, simulations, audio feedback, tactile feedback, visual feedback, and machine learning models. The overall user interface and interaction with the invention can be to use the wearable to collect peripheral sensor data to send to a smartphone or computer, which is capable of displaying and/or processing a simulation based visualization with any combination of real-time or near real-time visual, auditory, or tactile feedback. The data can then be stored in the cloud for later access and data can be pulled in any combination, in separately or in parallel, to the smartphone, computer, cloud data analysis pipeline, or web application for in depth analysis or data streaming visualizations. In other aspects, in addition to or instead of the cloud, the data can be stored on a server, hard drive, storage module, storage device, or other mechanism for saving electronic data as would be understood by one of ordinary skill in the art.

Figure 1:
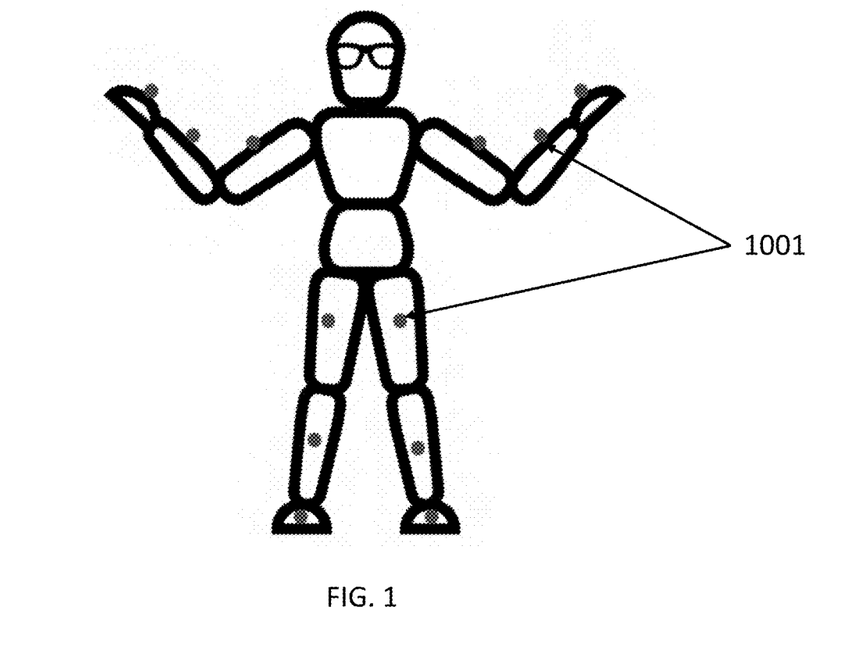
FIG. 1 is a front view of the full body electrical system placements on a full body wearable for collecting motion capture and location data from the user's movements in virtual reality, according to one embodiment of the present invention.
Figure 2:
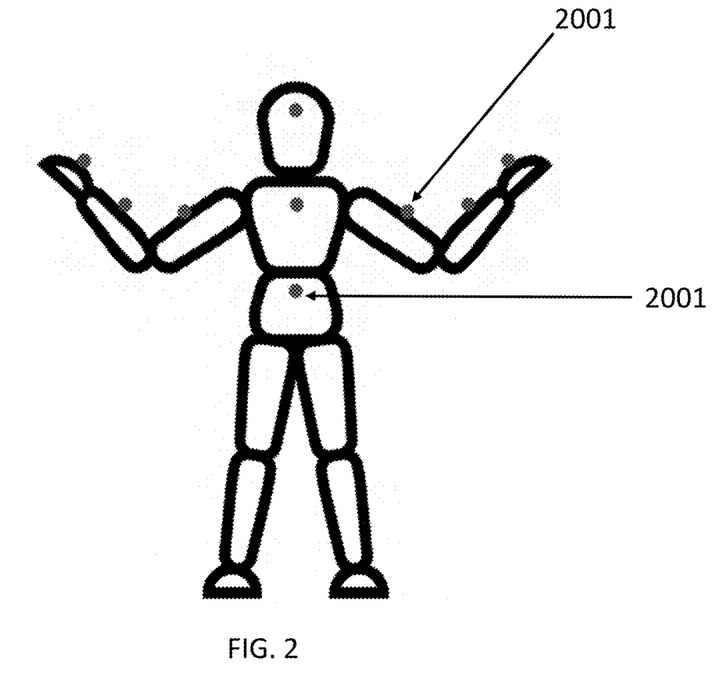
FIG. 2 is a back view of the full body electrical system placements on a full body wearable for collecting motion capture and location data from the user's movements in virtual reality, according to one embodiment of the present invention.

Another embodiment of the present invention is displayed in FIG. 1, which shows an example of a full body or mostly full body wearable. As a note for this particular figure, the figure is marked to represent, but not be limited to, the placements of these sensor modules to create a wireless electrical system that provide sensor data across the human body, but this is not a limitation since in embodiments one half of the suit can differ from the other half, and components may differ between body parts, limbs, or joints (e.g., one arm or hand of the system may be configured different in housing, location, or software from another arm or hand). (See, e.g., FIG. 2.) In FIG. 1, the sensors are indicated by the various dots 1001. (The sensors are similarly indicated in FIG. 2 as 2001.) In the embodiment shown in FIG. 1, the wearable can be connected to the upper torso using a harness device that wraps around the front, back, and waist, or through separated individual bands for each sensor system or grouped sensors or sensor systems. The electrical housing system can be connected to the body using bands and straps, by way of example. Additionally, the electrical housing can be a combination of rigid, semi-rigid, and/or flexible materials that can be used with certain components described herein.

Figure 3:
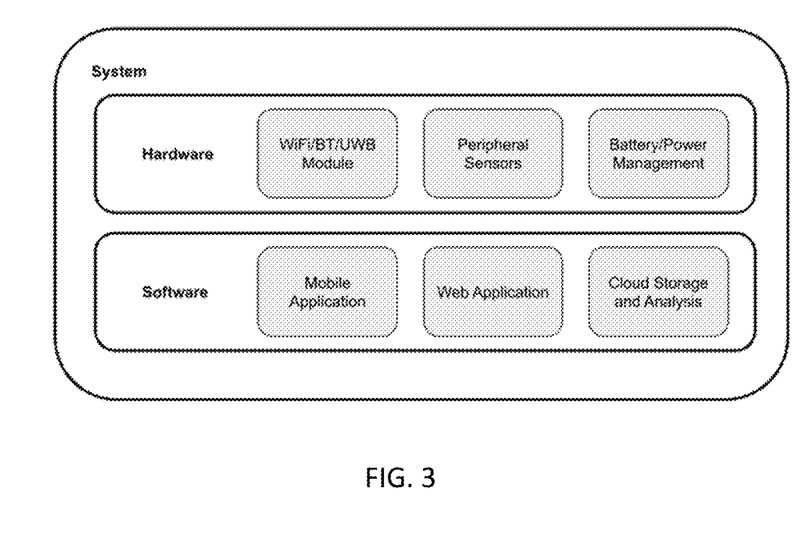
FIG. 3 is a diagram of the breakdown of the system within the hardware and software components that utilize one embodiment of the present invention to create a motion and location data based analysis platform.

Another embodiment of the present invention is a system of hardware and software components as shown in FIG. 3, which can work in conjunction with each other or function separately. The hardware components, in aspects, are comprised of location based sensors such as ultra wide band, ultrasonic, GPS, RF, Lidar and Bluetooth sensor systems; peripheral sensors such as, but not limited to, accelerometer, gyroscope, magnetometer, barometric, and temperature sensor systems; and a management system for the battery and power of the hardware. In embodiments, the hardware components function as a data collection tool to understand the motion and location of a moving body or body part, limb, or joint, and relay this information further. This includes, in aspects, communication with any simulation-based virtual endeavor including virtual and augmented reality systems. In embodiments, the software components can be comprised of a mobile application that can be developed for prominent platform such as iOS and Android, a custom web application that can be developed using fundamental programming techniques in JavaScript, for example, and a cloud-based storage and analysis backend platform that can be developed with, but is not limited to, a tool like Amazon Web Services. The mobile and web applications can behave as standalone interfaces for data collected from the aforementioned hardware components to display the data in both raw and processed formats. The processed formats, in aspects, can be representative of a virtual or augmented reality application that can also be a simulation-based representation to demonstrate visual and auditory based feedback. The cloud-based storage and analysis, in aspects, is to demonstrate autonomous quantitative analysis of the data to then be transmitted back to the mobile application and web application interfaces.

Figure 5:
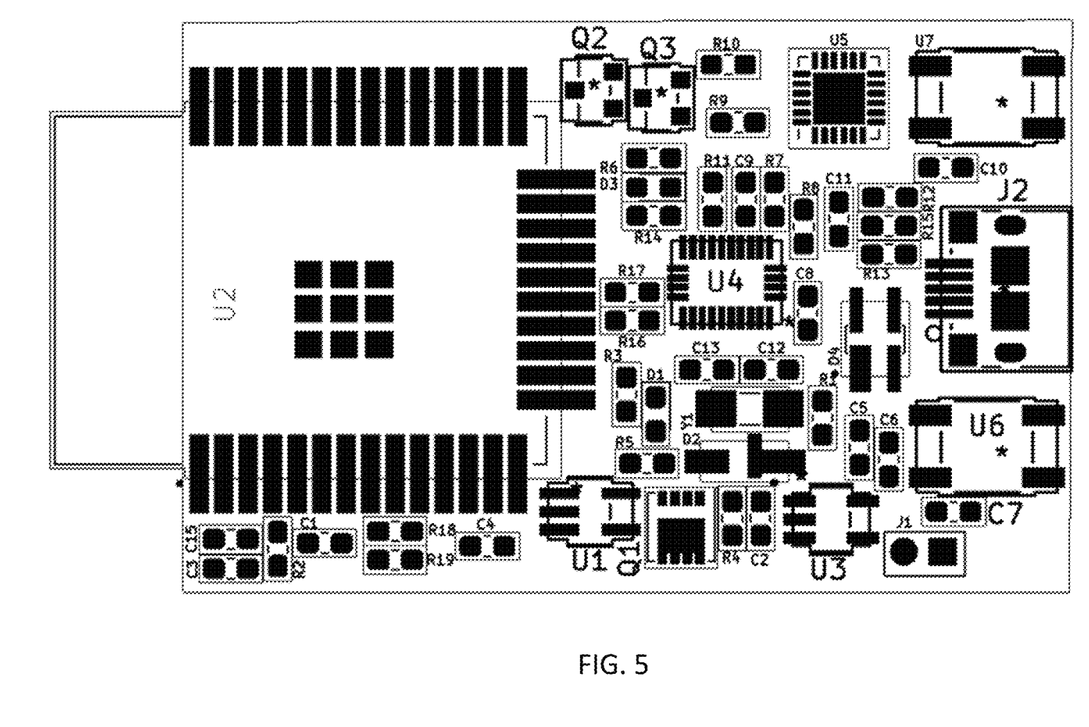
FIG. 5 is a layout of one embodiment of the electrical system that focuses on testing, customizability, and modularity.
Figure 6:
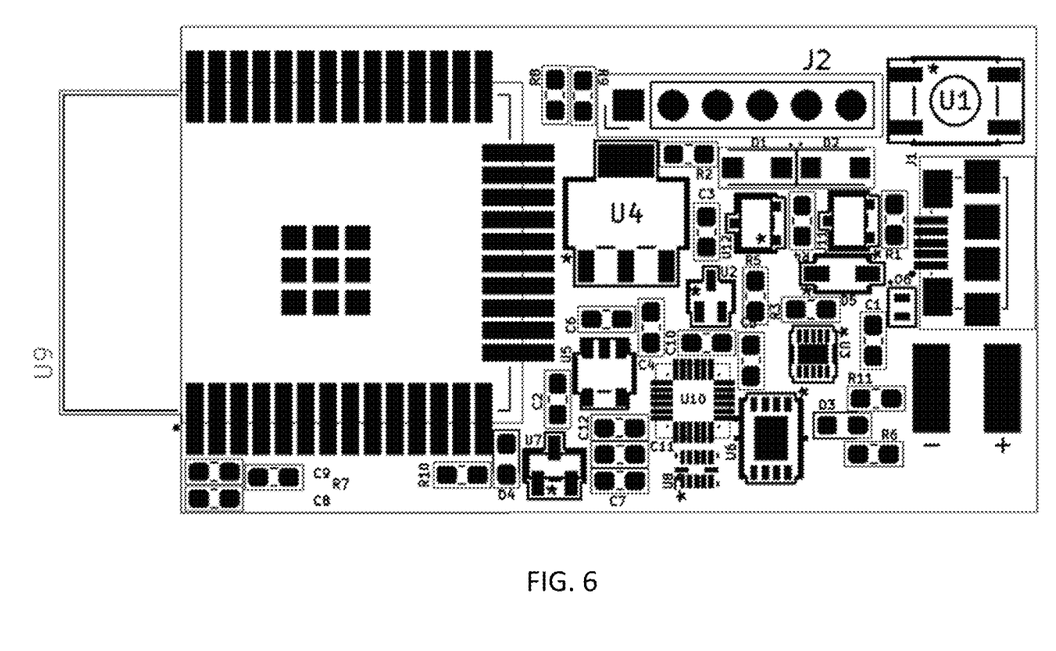
FIG. 6 is a layout of one embodiment of the electrical system that is designed for higher production at scale in its simpler but, in aspects, more rigid design.

An embodiment of the electrical system is shown in FIG. 5, which displays an example layout of the electrical system that teaches a programmable, lightweight, and customized design that can be to collect various sensor measurements, manage power and battery features, and communicate with an external device such as a smart device, computer, router, modem, or transceiver over Bluetooth, WiFi, or UWB. This particular embodiment focuses on sections that include the wireless communication module, including a processor and programmable embedded system, sensor peripheral system that communicates over I2C, UART, or SPI (by way of example only) to the processor to collect measurements autonomously or on command, and a battery/power management system to regulate and protect power distribution and charging. FIG. 6 shows another embodiment of the electrical circuit that is modified to be lighter, cheaper, and smaller while having the same, similar, or in cases more functionality of the previous embodiment, but for higher scale production.

Figure 7:
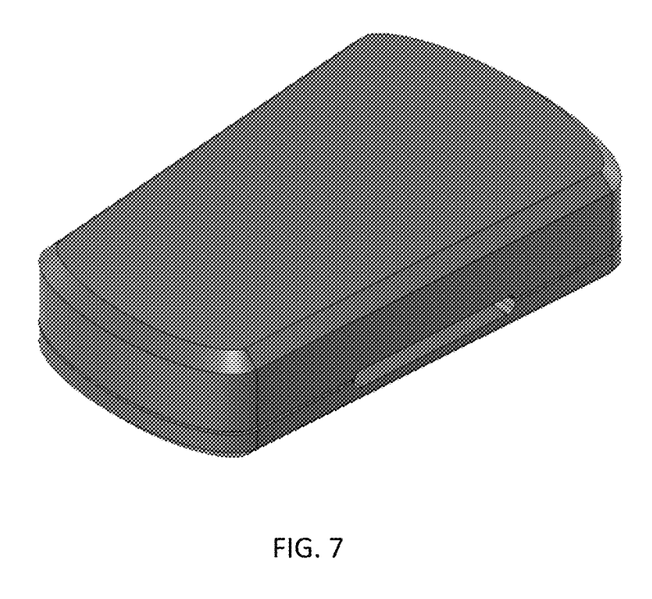
FIG. 7. is a perspective view of one embodiment of an electronic housing frame design for one embodiment of the present invention. This embodiment represents a rigid-focused body for housing an electrical system.
Figure 8:
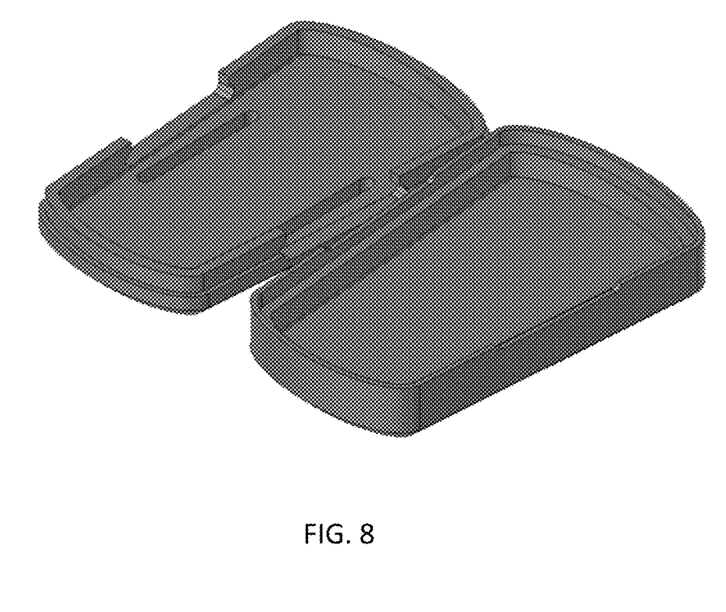
FIG. 8 is a perspective and inside view of one embodiment of an electronic housing frame design for one embodiment of the present invention. This embodiment represents a rigid-focused body for housing an electrical system.
Figure 9:
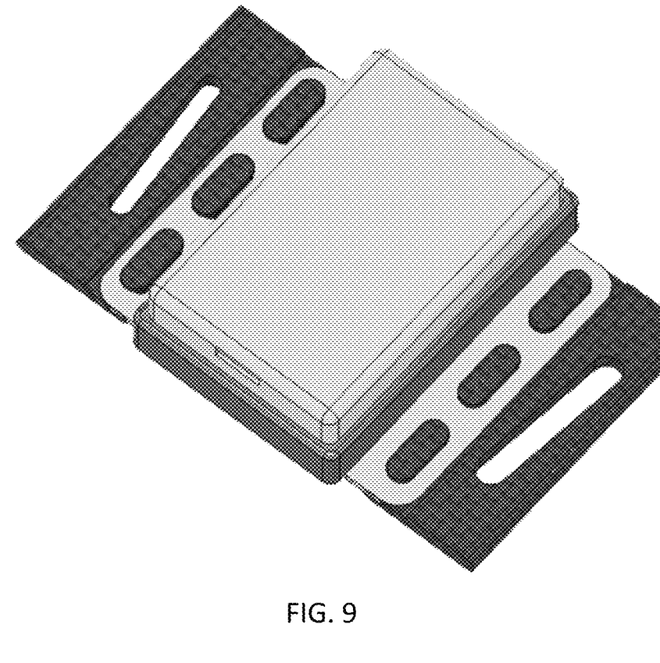
FIG. 9. is a perspective view of one embodiment of an electronic housing frame design for one embodiment of the present invention. This embodiment represents a combined flexible and rigid body for housing an electrical system.
Figure 10:
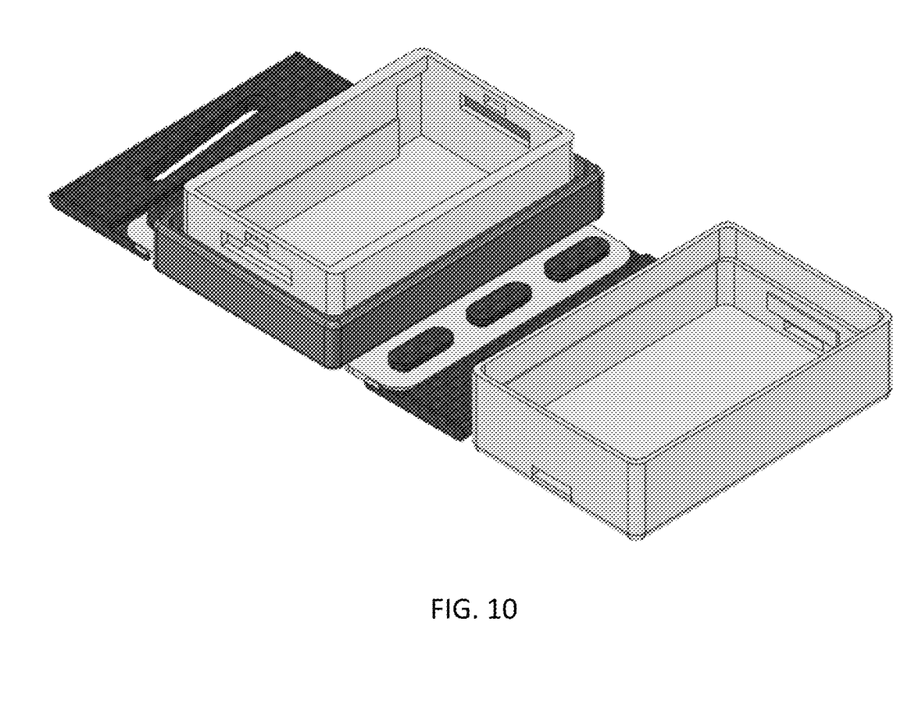
FIG. 10. is a perspective and inside view of one embodiment of an electronic housing frame design for one embodiment of the present invention. This embodiment represents a combined flexible and rigid body for housing an electrical system.

One embodiment of an electronic housing frame design is shown in FIG. 7 and FIG. 8, which display both the housing as one body and separated to show an inside view. The housing design is developed to provide a modular approach to attaching multiple units of the present invention to any linkage on a moving object. This embodiment can be attached to any fabric to provide an ergonomic module to be placed around any linkage. In aspects, materials for this embodiment can be any type of plastic that creates a rigid and/or robust body surrounding aspects of the present invention. Another embodiment of an electronic housing frame design is shown in FIG. 9 and FIG. 10, which display again both the housing as one body and separated to show an inside view. This embodiment can also be attached to any fabric to provide an ergonomic module to be placed around any linkage of a moving object. In aspects, materials for this embodiment can be a combination of flexible and rigid plastics that allow for the present invention to conform better to a number of varying surfaces.

Another embodiment of the invention can include use of the present invention or pieces, aspects, parts, or portions of the present invention for physical use by the user. Examples of this include, but are not limited to, physical training, physical therapy, exercise, or the monitoring and collection of user data. The suit or its components as described herein can be used passively, in aspects, to monitor and collect data using sensors or computer interfaces, and the data collected can be analyzed either internally or externally.

Embodiments of the invention also include a computer readable medium comprising one or more computer files comprising a set of computer-executable instructions for performing one or more of the calculations, steps, processes and operations described and/or depicted herein. In exemplary embodiments, the files may be stored contiguously or non-contiguously on the computer-readable medium. Embodiments may include a computer program product comprising the computer files, either in the form of the computer-readable medium comprising the computer files and, optionally, made available to a consumer through packaging, or alternatively made available to a consumer through electronic distribution. As used in the context of this specification, a "computer-readable medium" is a non-transitory computer-readable medium and includes any kind of computer memory such as floppy disks, conventional hard disks, CD-ROM, Flash ROM, non-volatile ROM, electrically erasable programmable read-only memory (EEPROM), and RAM. In exemplary embodiments, the computer readable medium has a set of instructions stored thereon which, when executed by a processor, cause the processor to perform tasks, based on data stored in the electronic database or memory described herein. The processor may implement this process through any of the procedures discussed in this disclosure or through any equivalent procedure.

In other embodiments of the invention, files comprising the set of computer-executable instructions may be stored in computer-readable memory on a single computer or distributed across multiple computers. A skilled artisan will further appreciate, in light of this disclosure, how the invention can be implemented, in addition to software, using hardware or firmware. As such, as used herein, the operations of the invention can be implemented in a system comprising a combination of software, hardware, or firmware.

Embodiments of this disclosure include one or more computers or devices loaded with a set of the computer-executable instructions described herein. The computers or devices may be a general purpose computer, a special-purpose computer, or other programmable data processing apparatus to produce a particular machine, such that the one or more computers or devices are instructed and configured to carry out the calculations, processes, steps, operations, algorithms, statistical methods, formulas, or computational routines of this disclosure. The computer or device performing the specified calculations, processes, steps, operations, algorithms, statistical methods, formulas, or computational routines of this disclosure may comprise at least one processing element such as a central processing unit (i.e., processor) and a form of computer-readable memory which may include random-access memory (RAM) or read-only memory (ROM). The computer-executable instructions can be embedded in computer hardware or stored in the computer-readable memory such that the computer or device may be directed to perform one or more of the calculations, steps, processes and operations depicted and/or described herein.

Additional embodiments of this disclosure comprise a computer system for carrying out the computer-implemented method of this disclosure. The computer system may comprise a processor for executing the computer-executable instructions, one or more electronic databases containing the data or information described herein, an input/output interface or user interface, and a set of instructions (e.g., software) for carrying out the method. The computer system can include a stand-alone computer, such as a desktop computer, a portable computer, such as a tablet, laptop, PDA, or smartphone, or a set of computers connected through a network including a client-server configuration and one or more database servers. The network may use any suitable network protocol, including IP, UDP, or ICMP, and may be any suitable wired or wireless network including any local area network, wide area network, Internet network, telecommunications network, Wi-Fi enabled network, or Bluetooth enabled network. In one embodiment, the computer system comprises a central computer connected to the internet that has the computer-executable instructions stored in memory that is operably connected to an internal electronic database. The central computer may perform the computer-implemented method based on input and commands received from remote computers through the internet. The central computer may effectively serve as a server and the remote computers may serve as client computers such that the server-client relationship is established, and the client computers issue queries or receive output from the server over a network.

The input/output interfaces may include a graphical user interface (GUI) which may be used in conjunction with the computer-executable code and electronic databases. The graphical user interface may allow a user to perform these tasks through the use of text fields, check boxes, pull-downs, command buttons, and the like. A skilled artisan will appreciate how such graphical features may be implemented for performing the tasks of this disclosure. The user interface may optionally be accessible through a computer connected to the internet. In one embodiment, the user interface is accessible by typing in an internet address through an industry standard web browser and logging into a web page. The user interface may then be operated through a remote computer (client computer) accessing the web page and transmitting queries or receiving output from a server through a network connection.

One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed.

The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A modular sensor system for capturing sensor data in relation to a human body, the system comprising:
   a plurality of wearable sensors, the plurality of wearable sensors including one or more of: a motion sensor, a location tracking sensor, and a biopotential sensor, the wearable sensors providing for at least one of: relaying, capturing, and measuring feedback data, the feedback data including at least one of: motion data, location data, and physiological state data, the feedback data relating to at least one of: a human body, a body part, a limb, and a joint;
   a plurality of releasable attachment mechanisms, such that the plurality of wearable sensors are in engagement relative to the human body via engagement with the releasable attachment mechanisms;
   at least one communicator for relaying the feedback data to at least one of: a virtual reality environment, an augmented reality environment, and a mixed reality environment, whereby the relaying of the feedback data modifies at least one virtual element within a virtual space, the at least one virtual element being at least one of a virtual object and a virtual being to provide feedback on kinetics of the at least one of: the human body, the body part, the limb, and the joint.

2. The modular sensor system of claim 1, wherein the plurality of wearable sensors include at least one of: an accelerometer, a gyroscope, a magnetometer, a barometer, a temperature sensor, an electrocardiogram, an electroencephalogram, an electromyogram, and an electrooculogram.

3. The modular sensor system of claim 1, wherein the plurality of wearable sensors include a location-based sensor comprising at least one of: an ultra wide band sensor, an ultrasonic sensor, a global positioning system sensor, a radio frequency sensor, a lidar sensor, and a Bluetooth sensor.

4. The modular sensor system of claim 1 further comprising:
   a wearable apparatus comprised of at least one of: a rigid material, a semi-rigid material, a bendable material, and a soft material.

5. The modular sensor system of claim 1, wherein the modular sensor system collects and autonomously analyzes the feedback data.

6. The modular sensor system of claim 1, wherein the modular sensor system collects the feedback data and transmits the feedback data to a backend cloud database and outputs analyzed data to a computer, mobile electronic device, internet, World Wide Web portal, World Wide Web application, World Wide Web address, or the virtual reality environment, the augmented reality environment, the mixed reality environment, or combinations thereof.

7. The modular sensor system of claim 1, wherein the plurality of wearable sensors are attached to or embedded in two or more different bands or sleeves that can be worn and removed by a user.

8. The modular sensor system of claim 1, wherein the feedback data is combined to obtain a global positioning and orientation of a user in real-time or near real-time.

9. The modular sensor system of claim 1, wherein the plurality of wearable sensors are housed within a rigid material, semi-rigid material, bendable material, or soft container that is removably attached to a band, strap, or article of clothing.

10. The modular sensor system of claim 1, wherein the plurality of wearable sensors are housed within a rigid material, semi-rigid material, bendable material, or soft container that is removably attached to a user's body, joint, limb, or body part.

11. A modular sensor system for capturing sensor data in relation to a human body, the system comprising:
   a plurality of wearable sensors, the plurality of wearable sensors including one or more of: a motion sensor, a location tracking sensor, and a biopotential sensor, the wearable sensors providing for at least one of: relaying, capturing, and measuring feedback data, the feedback data including at least one of: motion data, location data, and physiological state data, the feedback data relating to at least one of: a human body, a body part, a limb, and a joint;
   a plurality of releasable attachment mechanisms, such that the plurality of wearable sensors are in engagement relative to the human body via engagement with the releasable attachment mechanisms;
   at least one communicator for relaying the feedback data to at least one of: a virtual reality environment, an augmented reality environment, and a mixed reality environment, whereby the relaying of the feedback data modifies at least one physical element within a physical space, the at least one physical element being at least one of a prosthetic and a robotic element to provide feedback on kinetics of the at least one of: the human body, the body part, the limb, and the joint.

12. The modular sensor system of claim 11, wherein the plurality of wearable sensors include at least one of: an accelerometer, a gyroscope, a magnetometer, a barometer, a temperature sensor, an electrocardiogram, an electroencephalogram, an electromyogram, and an electrooculogram.

13. The modular sensor system of claim 11, wherein the plurality of wearable sensors include a location-based sensor comprising at least one of: an ultra wide band sensor, an ultrasonic sensor, a global positioning system sensor, a radio frequency sensor, a lidar sensor, and a Bluetooth sensor.

14. The modular sensor system of claim 11 further comprising:
   a wearable apparatus comprised of at least one of: a rigid material, a semi-rigid material, a bendable material, and a soft material.

15. The modular sensor system of claim 11, wherein the modular sensor system collects and autonomously analyzes the feedback data.

16. The modular sensor system of claim 11, wherein the modular sensor system collects the feedback data and transmits the feedback data to a backend cloud database and outputs analyzed data to a computer, mobile electronic device, internet, World Wide Web portal, World Wide Web application, World Wide Web address, or the virtual reality environment, the augmented reality environment, the mixed reality environment, or combinations thereof.

17. The modular sensor system of claim 11, wherein the plurality of wearable sensors are attached to or embedded in two or more different bands or sleeves that can be worn and removed by a user.

18. The modular sensor system of claim 11, wherein the feedback data is combined to obtain a global positioning and orientation of a user in real-time or near real-time.

19. The modular sensor system of claim 11, wherein the plurality of wearable sensors are housed within a rigid material, semi-rigid material, bendable material, or soft container that is removably attached to a band, strap, or article of clothing.

20. The modular sensor system of claim 11, wherein the plurality of wearable sensors are housed within a rigid material, semi-rigid material, bendable material, or soft container that is removably attached to a user's body, joint, limb, or body part.

\* \* \* \* \*